Figures 1, 2:
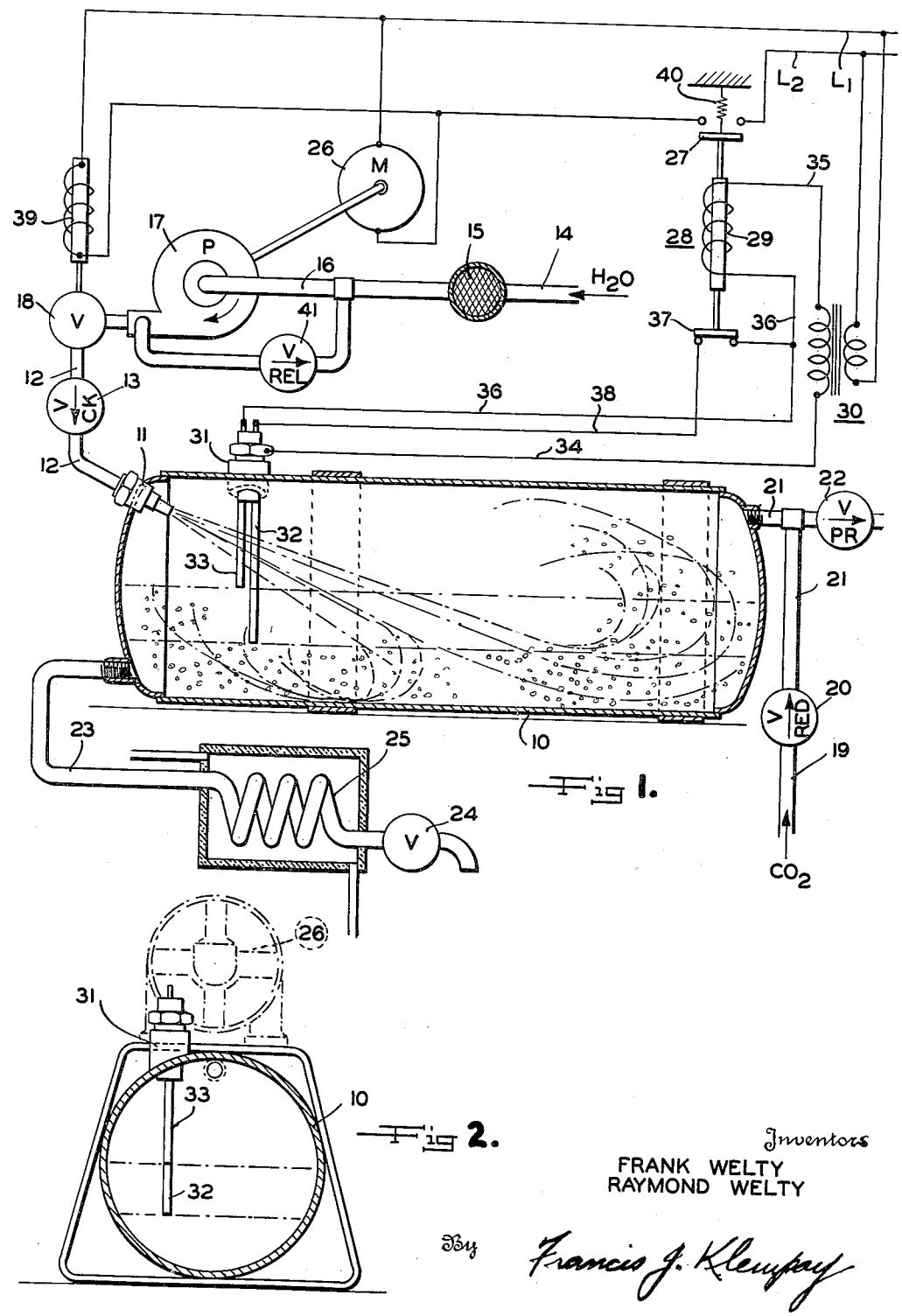

Inventors
FRANK WELTY
RAYMOND WELTY

By Francis J. Klempay

Patented Mar. 11, 1952

2,588,677

UNITED STATES PATENT OFFICE 2,588,677

AUTOMATIC LIQUID CARBONATOR

Frank Welty and Raymond D. Welty, Youngstown, Ohio, assignors to Carbonic Dispenser, Inc., Canfield, Ohio, a corporation of Ohio Application February 26, 1948, Serial No. 11,008

11 Claims. (Cl. 261—27)

1

This invention relates to apparatus for preparing and furnishing carbonated water and more particularly to improved and simplified apparatus which is operative to furnish carbonated water in large or small volume in a wholly automatic manner and with a high degree of concentration of the carbon dioxide gas. The principal object of the invention is the provision of apparatus of the general character stated which is simple in design, easy to make and assemble, and which is operative over long periods of time with a minimum of attention, and which is operative to furnish large or small volumes of adequately carbonated water from a gas source and from a water source of widely varying pressure through the use of a small motor and with a minimum of power consumption.

The normal requirements of carbonators for soda fountain and other beverage dispensing installations include a high peak manufacturing capacity as well as a storage facility operative to maintain the dispensing conduits filled with adequately carbonated water at all times. Heretofore, these requirements have necessitated the use of quite large and bulky equipment powered with large motors drawing considerable current and the main reason for the use of this heavy equipment has been the difficulty encountered in rapidly distributing and absorbing the required multiple volumes of gas in the water mass while yet providing the storage facilities so that a substantial volume of properly carbonated water is instantly available for dispensing use at all times. The equipment heretofore employed, whether based on a mechanical agitation principle, on a spray principle, or on the use of cascading banks of water, operates at high pressures particularly where the storage facility is provided since in no other way has it been possible heretofore to not only rapidly carbonate the incoming clear water but also to maintain on hand at all times a proper supply of adequately carbonated water. It is accordingly another primary object of our invention to provide carbonating apparatus having a storage facility which is much more effective than devices heretofore proposed in securing a very rapid distribution and absorption of the carbon dioxide gas in the clear water furnished and wherein the supply of previously carbonated water in the apparatus is automatically re-circulated and re-vitalized at each cycle of operation of the apparatus to the end that the pressures required to effect rapid distribution and absorption of the gas is materially reduced as is also the pressure required to maintain an adequate concentration of the gas in the stored carbonated water. It will be evident that this general method of operation minimizes the power required for actuation of the apparatus and, further, reduces the complexity and physical size of the apparatus.

A further object of the invention is the provision of carbonating apparatus having the characteristics mentioned above which is reliable, safe and efficient in operation and which does not depend on critical factors or critical adjustments for its continued proper operation. Thus, the apparatus of the invention is not dependent on any particular pressure of the water supply for its proper functioning, making the apparatus dependable under widely varying water supply conditions and making the apparatus well suited for use in dispensing equipment where no commercial water pressure is available. Also, the apparatus of the invention is so arranged that its safety relief valve vents only air or gas so that connection to a drain is unnecessary, thus heightening the applicability of the assembled apparatus.

The above and other objects and advantages of the invention will become apparent upon consideration of the following detailed specification and the accompanying drawing wherein there is disclosed a preferred embodiment of the invention.

Figure 1 is a schematic showing of a complete carbonating machine constructed in accordance with the principles of our invention; and Figure 2 is a transverse sectional view of a portion of the apparatus of Figure 1, the view indicating in dotted outline how the pump motor of the apparatus may be physically assembled with the mixing and storage tank thereof.

Referring to the drawing in detail, the principal part of our apparatus comprises a horizontally disposed tank 10 which is closed at either end and which in practice is preferably constructed of stainless steel with representative dimensions of 6 inch diameter and 15 inch length. Projecting angularly downward through an upper end of one of the end discs of the tank 10 is a water injection nozzle 11 connected with a conduit 12 in which is positioned check valve 13. Clear water is supplied to the conduit 12 from any suitable source represented by the conduit 14 through a strainer 15, a conduit 16, a motor driven pump 17, and a solenoid operated valve 18. Carbon dioxide gas is supplied to the tank 10 from any suitable source represented by the conduit 19 through a pressure regulating valve 20 and a conduit 21 in which is positioned pressure relief valve 22 having an outlet port open to the atmosphere. As shown in Figure 1 the conduit 21 discharges into the upper end of the tank 10 at a point substantially longitudinally opposite the location of the nozzle 11. Carbonated water is discharged from the lower end of the tank 10 at a point vertically below the nozzle 11 through a conduit 23 which is connected with a dispensing faucet 24. If desired, there may be interposed in the conduit 23 a cooling coil 25 which is normally incorporated in the dispensing bar structure as is well understood. However, the apparatus of our invention is such that the tank 10 itself may readily be subjected to direct refrigeration so that all the carbonated water stored in the tank may be kept at proper dispensing temperature thereby avoiding the use of a separate cooling coil although it will be understood that in this manner of use the discharge conduit 23 should be quite short so as to minimize the dispensing of inadequately cooled carbonated water.

The pump 17 is driven by an electric motor 26 which is energized from a suitable current source comprised of the line conductors L1 and L2 through a contactor 27 of a relay 28. Relay 28 is provided with a solenoid 29 which is arranged to be selectively energized by a transformer 30 under the control of a liquid level responsive device comprised of a current conductive fitting 31 bearing long and short depending electrodes 32 and 33, respectively, which are insulated from each other and from the fitting 31. The fitting 31 is mounted in an aperture formed in the top wall of the tank 10 and the electrodes 32 and 33 depend vertically into the tank 10 as shown in both Figures 1 and 2. The fitting 31 which of course is grounded to the metal of the tank 10 is electrically connected with one terminal of the secondary of the transformer 30 by means of a conductor 34. The opposite terminal of the secondary of the transformer 30 is connected to one terminal of the solenoid 29 by means of a conductor 35 and the opposite terminal of the solenoid 29 is connected to the shorter electrode 33 by the conductor 36. The armature of the relay 28 is normally biased to upper position by a spring 40 and carries a second and normally open contactor 37 which when closed interconnects the conductor 36 with a conductor 38 leading to the longer electrode 32. Electrical energy is furnished the transformer 30 from the line conductors L1 and L2 through the circuit connection shown in Figure 1. A solenoid 39 connected in parallel with the energizing circuit for the motor 26 is operative to open the valve 18 simultaneously with energization of the motor 26. Valve 18 is normally closed.

The operation of the apparatus described above is substantially as follows: With the line conductors L1, L2 de-energized and a supply of carbon dioxide gas available at the source 19 the tank 10 will fill with the gas to a pressure determined by the setting of the valve 20 and in actual practice this pressure may be set at 100 lbs./sq. inch. If the line L1, L2 is now energized the normally closed contactor 27 will admit current to the motor 26 and the pump 17 will be started and simultaneously therewith the solenoid 39 will be energized to open the valve 18. Water will now be injected through the nozzle 11 into the tank 10 at a maximum pressure determined by the setting of a bypass pressure relief valve 41 which is connected between the outlet and the inlet of the pump 17 and in actual practice the valve 41 may be set to open at 135 lbs./sq. inch pressure thus limiting the fluid pressure of the nozzle 11 to this value. Initially the jet of water issuing from the nozzle 11 will strike the bottom of the tank 10 and be dispersed upwardly and outwardly into intimate divided contact with the gaseous atmosphere in the tank. As the liquid level in the tank begins to rise all the liquid in the tank will be violently agitated, continuously re-circulated and caused to foam or "boil" by the action of the jet issuing from the nozzle 11 and in this manner very large and continuously changing surfaces of the liquid mass will be brought into contact with the gas in the tank, thus effecting a rapid absorption of the gas by the liquid. As the gas pressure in the tank 10 begins to fall due to the absorption of the gas by the liquid the valve 20 opens to admit further quantities of gas in the tank to maintain the pressure therein at the initial value of 100 lbs./sq. inch, for example. Since the holding contactor 37 is open during energization of the motor 26 the contacting of the liquid mass in the tank 10 with the electrode 32 will have no effect and the solenoid 29 will be energized to open the contactor 27 only when the liquid level in the tank 10 reaches the shorter electrode 33—the energizing circuit being traceable from the secondary of transformer 30 through conductor 35, solenoid 29, conductor 36, electrode 33, the liquid mass in tank 10, fitting 31, and conductor 34 to the opposite terminal of the secondary of transformer 30. Upon energization of solenoid 29 the contactor 27 will be opened to stop the motor 17 and close the valve 18 while contactor 37 will be closed to establish a holding circuit through conductor 38 and electrode 32 to hold off the pump 17 and to hold closed the valve 18 until the liquid level in the tank 10 drops below the bottom end of the electrode 32.

An important aspect of our invention is the violent agitation and churning of all the liquid in the tank 10 upon each addition of clear water to the tank. Thus, the added water is immediately and intimately intermixed with the carbonated water stored in the tank and the entire mass is then brought into foaming contact with the gaseous environment in the tank. We have found (by actual test) that this apparatus is capable of fully carbonating incoming water at the full rate of flow of the water through the tank i. e. full flow through ⅜-inch diameter tubing in the outlet conduit under the pre-set 100 lb./sq. inch pressure. With the incoming water at a temperature of 50° F. the gas concentration in the discharged carbonated water is 8.5 volumes of gas to one volume of water and with the temperature of the incoming water reduced to 33° F. the concentration will increase to 12 volumes of gas to one volume of water. Moreover, all this may be accomplished without increasing the pressure in the tank 10 above the prescribed setting for the valve 20. This means that the rate of absorption of the gas by the incoming water is by volume at least equal or slightly greater than the volumetric rate of supply of the water. The concentrations achieved, however, indicate that the gas is supplied to the tank through the valve 20 at a considerably higher rate during each operation of the pump 17.

Since the volume of charged water lying in the bottom of the tank 10 between the levels of the lower ends of the electrodes 32 and 33 is quite small the pump 17 will be actuated at sufficiently close intervals, during normal usage, to maintain the stored and charged water in proper condition at all times. The vertical interval between the lower ends of the control electrodes may, of course, be varied in accordance with conditions encountered in particular installations.

The function of the valve 18 is to prevent a slow infusion of fresh water into the carbonating and storage tank 10 in the event that the pressure in the water supply 14 exceeds the pressure existent in the tank 10. Such slow filling of the tank would be without benefit of the normally occurring gas absorbing agitation and the extent of gas concentration in the water discharge would diminish. The function of the check valve 13 is to prevent the gas entrapped in the tank 10 from escaping through the water in'et piping under any and all conditions. Valve 22 is simply a safety relief valve which opens when the pressure in the tank 10 reaches a dangerously high value from any cause whatsoever (mal-functioning of the gas regulating valve 20, for example) but it should be noted that the tank inlet to the valve 22 is at the upper end of the tank 10 so that only gas or air is discharged. The apparatus of the invention need not therefore be connected to a drain and this aspect is highly advantageous in certain installations as will be well understood.

An unobvious but more important feature of this apparatus herein described is the inability of the apparatus to deliver to the dispensing faucet uncarbonated water in any appreciable volume. In prior art apparatus of which we are aware water is continued to be furnished even though the supply of gas is exhausted and there is no warning to the operator that the supply of gas has in fact run out. Consequently the operator may unwittingly continue to serve uncharged or weakly charged water for a considerable length of time. In our apparatus, however, an exhaustion of the supply of gas at the source 19 rapidly reduces the pressure in the tank 10 and the condition is soon reached wherein the vacuum existent in the upper end of the tank 10 will prevent the outflow of water from the lower end thereof. Immediately upon this condition becoming of such severity that the liquid level in the tank 10 cannot drop from the lower end of electrode 33 to the lower end of electrode 32 no water can flow out of the tank and the pump motor 26 cannot be energized to replenish the supply of water in the tank. The positive blocking provided by the valve 18 is found advantageous in eliminating the necessity for a check valve in the gas supply inlet.

In accordance with usual practice, the motor 26 will normally be furnished with an overload protector, not shown herein, and this device together with the relief valve 41 will function to protect the motor 26 in case the liquid level control or the gas regulating valve 20 fail to function properly. As explained above, the valve 41 may be set to open at 135 lbs./sq. inch pressure and if the motor 26 continues to operate against this head for any appreciable length of time, the motor will be automatically de-energized by tripping of its overload protector. The normal load on the pump 17 may, in this illustration, be taken as a differential of 100 lbs./sq. inch and normally this increment added to the pressure of the water at the source 14 will be sufficient to overcome the pressure drop in the nozzle 11 while yet forcing water through the nozzle at a high velocity. If the liquid level control fails to function, however, the pressure at the outlet of the pump 17 will build up rapidly and shortly after the valve 41 opens the motor 26 will be automatically de-energized by its protector. The function of the valve 41 is such that during the interval of time required for the actuation of the overload protector no water will enter the tank 10 and therefore even if the safety valve 22 does open because of failure of regulating valve 20, no liquid will pass out of the valve 22.

The apparatus described herein is simple and compact and any suitable physical embodiment thereof is of small dimension enabling the use of the apparatus in a wide variety of installations including small compact coin-operated beverage dispensing cabinets. Further, the apparatus is highly advantageous for use in such installations since it is not dependent on the existence of any positive pressure at the water source and since under no circumstances can liquid be distributed through the safety relief valve 22. Also, uncharged water cannot be dispensed and in the case of automatic vending equipment it is a simple matter to arrange a coin return lever for operation by the pressure existent in the tank 10. The apparatus is also capable of being readily furnished with suitable means to vent air from the upper end of the tank 10 if this is considered necessary or desirable. As the entrapped air is lighter than the gas it will rise to the top of the tank and a suitable small bleeder valve, not shown, may be tapped in a high point of the tank and arranged to be opened simultaneously with operation of the motor 26. The orifice in such valve would be quite small as the volume of air entrapped is also quite small and in the event no air is available for venting, only a small amount of the carbon dioxide gas would escape which, in itself, is of no particular disadvantage.

It should now be apparent that we have provided an improved liquid carbonator which accomplishes the objects initially set out. The apparatus is simple in design, compact versatile in application, and entirely automatic in operation. Regarding the power requirement, it should be noted that the pump 17 need only add a pressure increment to the initial pressure of the water at the source 14 sufficient to force the water through the nozzle 11 at the desired velocity against the pressure head developed in the tank 10 by the gas supply. In the specific embodiment of the invention herein described a motor of $\frac{1}{6}$ H. P. has been found sufficient for the purposes of the motor 26. An important aspect of the invention is thought to lie in the size and shape of the tank 10 and in the relation of the tank 10 to the position, construction, and pressures employed at the nozzle 11 whereby during operation of the apparatus the mass of water in the tank is exposed to the greatest gas contact area, the water mass having maximum free movement through the gas area, and wherein the re-circulation and effervescing of the water mass in the tank is accomplished with a minimum of apparatus (the water inlet jet) and with a minimum power consumption.

The above specifically described embodiment of the invention should be considered as illustrative only as obviously many changes may be made therein without departing from the spirit or scope of the invention. Reference should therefore be had to the appended claims in determining the scope of the invention.

We claim:

1. Carbonating apparatus comprising an elongated horizontally disposed tank, means to conduct a gas into said tank, a water injection nozzle extending into one end of said tank in downwardly inclined direction to discharge a compact stream of water into said tank, a motor driven pump for furnishing water under pressure to said nozzle, a liquid level responsive device in control of the operation of said motor driven pump, said nozzle being so positioned that its axis of discharge intersects the surface of the liquid in said tank at a point substantially removed from the peripheral outline of said surface whereby upon operation of said pump the water in said tank is brought to a foaming mass in a recirculating manner into dispersed contact with the gas, and means to withdraw carbonated water from the lower portion of said tank.

2. Carbonating apparatus comprising an elongated horizontally disposed tank, said tank being rounded in cross section and having means to admit thereinto carbon dioxide gas, a water injecting nozzle projecting into said tank from the upper side of one end thereof to discharge a compact stream of water into said tank, a motor driven pump to furnish water under pressure to said nozzle, a liquid level responsive device in control of the operation of said pump to maintain the water in said tank between pre-determined levels, said nozzle being so positioned that its axis of discharge intersects the surface of the water in said tank at a point substantially removed from the peripheral outline of said surface and at an angle substantially less than 90° to said surface whereby said stream is operative to bring the water in said tank to a foaming mass in a recirculating manner into dispersed contact with the gas, and means to withdraw carbonated water from the lower portion of said tank.

3. Apparatus according to claim 1 further including an energizing circuit for said motor driven pump, a normally closed valve in the conduit interconnecting the outlet of said pump and said nozzle, and means comprising said energizing circuit to open said valve simultaneously with operation of said pump, said tank being of the closed type whereby upon closure of said valve and failure of said gas supply water cannot normally be withdrawn from the lower portion of said tank.

4. Carbonating apparatus having a closed combined mixing and storage tank, means to normally supply carbon dioxide gas to said tank, means to supply water to said tank comprising a water injector nozzle operative to direct a compact stream of water, means to supply water under pressure to said nozzle, a liquid level responsive device in control of said water supply means to maintain a predetermined body of water in the tank, said nozzle being positioned above the body of water in said tank and being so positioned that its axis of discharge intersects the surface of the water in said tank at a point substantially removed from the peripheral outline of said surface whereby the water in said tank is brought to a foaming mass in a recirculating manner into dispersed contact with the gas, and means to withdraw carbonated water from the lower portion of said tank.

5. Carbonating apparatus comprising an elongated horizontally disposed tank substantially circular in cross-section, means to maintain a body of water in the lower portion of the tank, a water injection nozzle extending into the upper portion of one end of said tank in downwardly inclined direction to discharge a compact stream of water into violent oblique contact with the surface of said body of water and intermediate the peripheral confines thereof to thereby effect recirculation and foaming and dispersion of said body of water throughout substantially the whole of the space in said tank, means to supply water under pressure to said nozzle, and means to supply carbon dioxide gas to said tank.

6. Carbonating apparatus comprising a closed elongated horizontally disposed tank, means to conduct water into said tank comprising a water injecting nozzle mounted on an upper portion of the tank wall at one end of the tank to discharge a compact stream of water into said tank, a liquid level responsive device comprising a pair of vertically disposed electrodes depending into said tank adjacent said one end thereof in offset relation to the axis of discharge of said nozzle, means to conduct a carbonating gas under pressure into the upper portion of said tank, a motor driven pump having its outlet connected with said nozzle and arranged to be controlled by said device to maintain a predetermined quantity of water in the lower portion of said tank, said nozzle being so positioned that its axis of discharge intersects the surface of the water in said tank at a point substantially removed from the peripheral outline of said surface whereby upon operation of said pump substantially all the water contained in said tank is brought to a foaming mass in dispersed contact with the gas contained in said tank.

7. Apparatus according to claim 6 further including a solenoid operated valve in control of the supply of water to said nozzle and circuit means to energize said solenoid to open said valve simultaneously with energization of said motor driven pump under the control of said device.

8. Apparatus for carbonating a liquid comprising a closed tank, means for maintaining a predetermined quantity of liquid in the bottom of said tank, means to admit carbonating gas into the top of said tank, a liquid injection nozzle adapted to discharge a compact stream of liquid into said tank above the body of water stored therein and being so positioned that its axis of discharge intersects the surface of the liquid in said tank at a point substantially removed from the peripheral outline of said surface, and means to supply liquid under pressure to said nozzle, the arrangement being such that said jet of liquid causes recirculation in said quantity of liquid while bringing successive portions thereof into foamescent contact with the gas in said tank.

9. Apparatus according to claim 8 further characterized in that the axis of discharge of said nozzle is so related to said body of liquid that a portion of said body of liquid remains quiescent, and an outlet in said tank adjacent said quiescent portion of said body of liquid to withdraw carbonated liquid from said tank.

10. Apparatus for carbonating a liquid comprising a closed tank, means for maintaining a predetermined quantity of liquid in the bottom of said tank, means to supply carbonating gas under pressure to the space in said tank, a liquid injection nozzle adapted to discharge a compact stream of liquid into said tank above the body of water stored and being so positioned that its axis of discharge intersects the surface of the liquid in said tank at a point substantially removed from the peripheral outline of said surface, means to supply liquid under pressure to said nozzle, the arrangement being such that the liquid issuing from said nozzle causes recirculation in said body of liquid while bringing successive portions thereof into foamescent contact with the gas in said tank, and said tank having an outlet port in its bottom portion substantially spaced from the axis of discharge of said nozzle.

11. Apparatus for carbonating a liquid comprising a closed tank, means for maintaining a predetermined quantity of liquid in the bottom of said tank, means to admit carbonating gas into the top of said tank, a liquid injection nozzle adapted to discharge a compact stream of liquid into said tank above the body of water stored therein and being so positioned that its axis of discharge intersects the surface of the liquid in said tank whereby at least a substantial portion of said stream intersects said surface, and means to supply liquid under pressure to said nozzle, the arrangement being such that said jet of liquid causes recirculation in said quantity of liquid while bringing successive portions thereof into foamescent contact with the gas in said tank.

FRANK WELTY.
RAYMOND D. WELTY.

The following references are of record in the file of this patent:

UNITED STATES PATENTS

| Number | Name | Date |
| --- | --- | --- |
| 998,428 | Stuhler | July 18, 1911 |
| 1,580,476 | Fassio | Apr. 13, 1926 |
| 2,128,311 | Mertes | Aug. 30, 1938 |
| 2,217,841 | Holinger | Oct. 15, 1940 |
| 2,235,357 | Conklin | Mar. 18, 1941 |
| 2,249,794 | Sutton | July 22, 1941 |
| 2,271,896 | Lewis | Feb. 3, 1942 |
| 2,300,300 | Lund | Oct. 27, 1942 |
| 2,339,640 | Holinger | Jan. 18, 1944 |
| 2,414,607 | Phillips | Jan. 21, 1947 |